US012645395B2

(12) United States Patent
Xue et al.

(10) Patent No.: US 12,645,395 B2
(45) Date of Patent: Jun. 2, 2026

(54) RATE LIMITING COMMANDS FOR SHARED WORK QUEUES BASED ON PROCESS THRESHOLD

(71) Applicant: Intel Corporation, Santa Clara, CA (US)

(72) Inventors: Zhan Xue, ShangHai (CN); Bo Cui, ShangHai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/940,666

(22) Filed: Sep. 8, 2022

(65) Prior Publication Data

US 2023/0004503 A1 Jan. 5, 2023

(30) Foreign Application Priority Data

Jul. 22, 2022 (WO) ................ PCT/CN2022/107344

(51) Int. Cl.
*G06F 3/06* (2006.01)

(52) U.S. Cl.
CPC ............ *G06F 3/0659* (2013.01); *G06F 3/061* (2013.01); *G06F 3/0683* (2013.01)

(58) Field of Classification Search
CPC ....... G06F 3/0659; G06F 3/061; G06F 3/0683
See application file for complete search history.

(56) References Cited

U.S. PATENT DOCUMENTS

| | | | |
|---|---|---|---|
| 10,437,616 B2 | 10/2019 | Agarwal et al. | |
| 10,970,238 B2 | 4/2021 | Sankaran et al. | |
| 11,144,473 B2 * | 10/2021 | Basu | ................... G06F 12/1036 |
| 2015/0378620 A1 * | 12/2015 | Brown | .................. G06F 3/0619 |
| | | | 711/162 |

* cited by examiner

*Primary Examiner* — Chie Yew
(74) *Attorney, Agent, or Firm* — KDW FIRM PLLC

(57) ABSTRACT

A memory management unit of a processor may receive a command associated with a process. The command may specify an operation to be performed by another device. The memory management unit may determine a counter value associated with a shared work queue of the another device, an indication the shared work queue to be specified by the command. The memory management unit may determine whether to accept or reject the command based on the counter value and a threshold for the process.

25 Claims, 9 Drawing Sheets

| Valid | Tag(Page Number) | Page Frame | ER | Count |
|---|---|---|---|---|
| 0 | 45 | 7 | 0 | 0 |
| 0 | 25 | 1 | 0 | 0 |
| 1 | 39 | 8 | 1 | (1,1,3000) |

700

Figure 8:
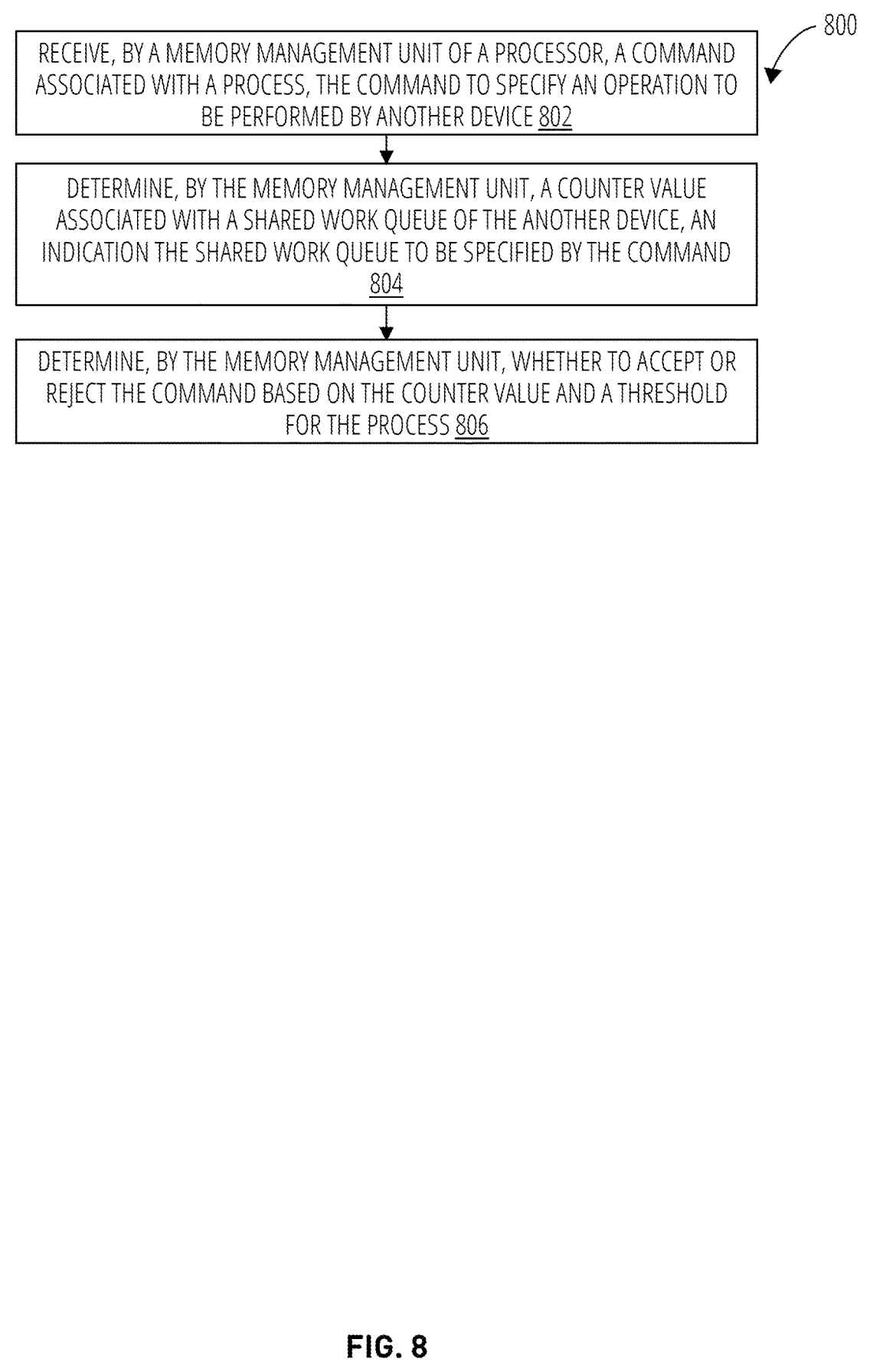

800

RECEIVE, BY A MEMORY MANAGEMENT UNIT OF A PROCESSOR, A COMMAND ASSOCIATED WITH A PROCESS, THE COMMAND TO SPECIFY AN OPERATION TO BE PERFORMED BY ANOTHER DEVICE 802

DETERMINE, BY THE MEMORY MANAGEMENT UNIT, A COUNTER VALUE ASSOCIATED WITH A SHARED WORK QUEUE OF THE ANOTHER DEVICE, AN INDICATION THE SHARED WORK QUEUE TO BE SPECIFIED BY THE COMMAND 804

DETERMINE, BY THE MEMORY MANAGEMENT UNIT, WHETHER TO ACCEPT OR REJECT THE COMMAND BASED ON THE COUNTER VALUE AND A THRESHOLD FOR THE PROCESS 806

Figure 9:
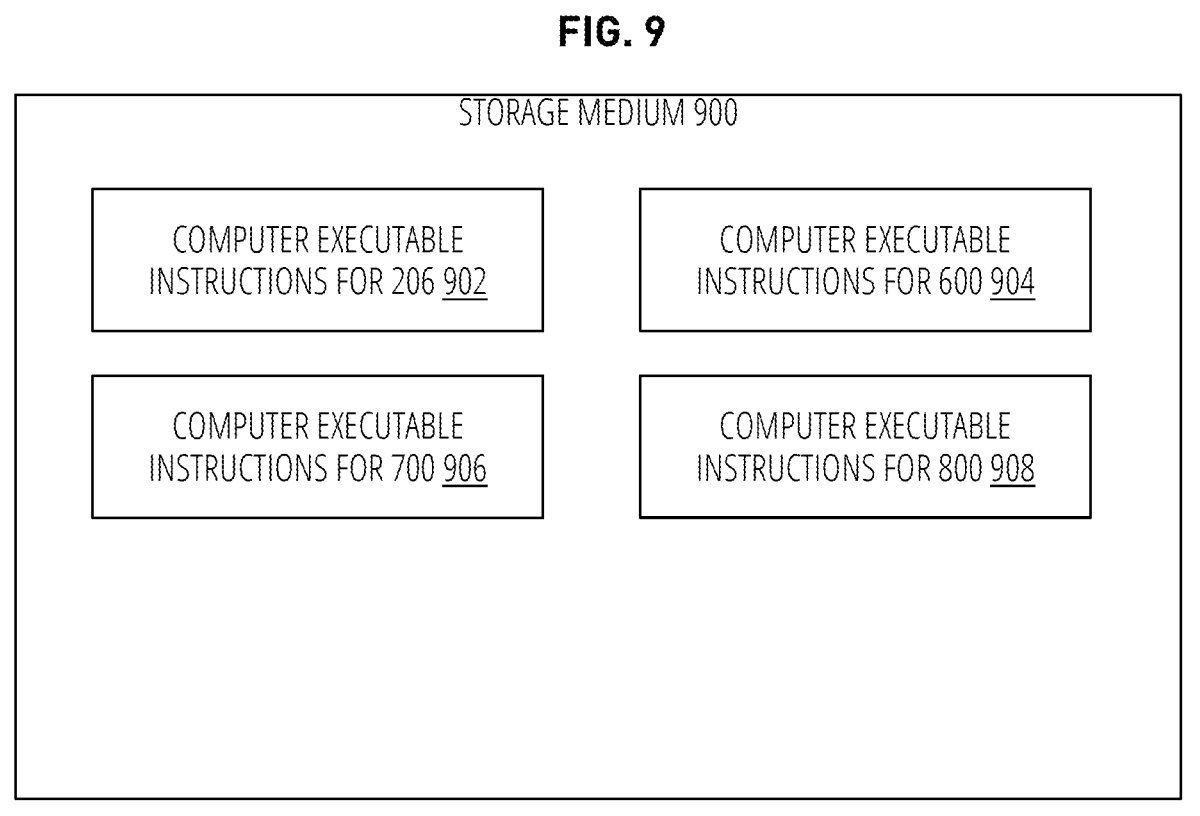

STORAGE MEDIUM 900

COMPUTER EXECUTABLE
INSTRUCTIONS FOR 206 902

COMPUTER EXECUTABLE
INSTRUCTIONS FOR 600 904

COMPUTER EXECUTABLE
INSTRUCTIONS FOR 700 906

COMPUTER EXECUTABLE
INSTRUCTIONS FOR 800 908

RATE LIMITING COMMANDS FOR SHARED WORK QUEUES BASED ON PROCESS THRESHOLD

CROSS-REFERENCE TO RELATED APPLICATIONS

This application claims the benefit of and priority to International Application No. PCT/CN2022/107344 entitled "RATE LIMITING COMMANDS FOR SHARED WORK QUEUES" filed Jul. 22, 2022, which is hereby incorporated by reference in its entirety.

BACKGROUND

In a multi-tenant computing environment, different software processes can share the same underlying hardware. Each process can submit work to a queue of the device. Furthermore, each process must wait for a response from the device that indicates whether the work was accepted or not accepted. However, when multiple processes submit requests to the same queue concurrently, these requests compete with each other. In some examples, one process may consume the resources of the device to the exclusion of other processes. Therefore, not all processes may be not able to access the device in a fair manner. Doing so may diminish performance and security.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates a logic flow in accordance with one embodiment.

FIG. 9 illustrates an aspect of a storage medium in accordance with one embodiment.

DETAILED DESCRIPTION

Figure 1:
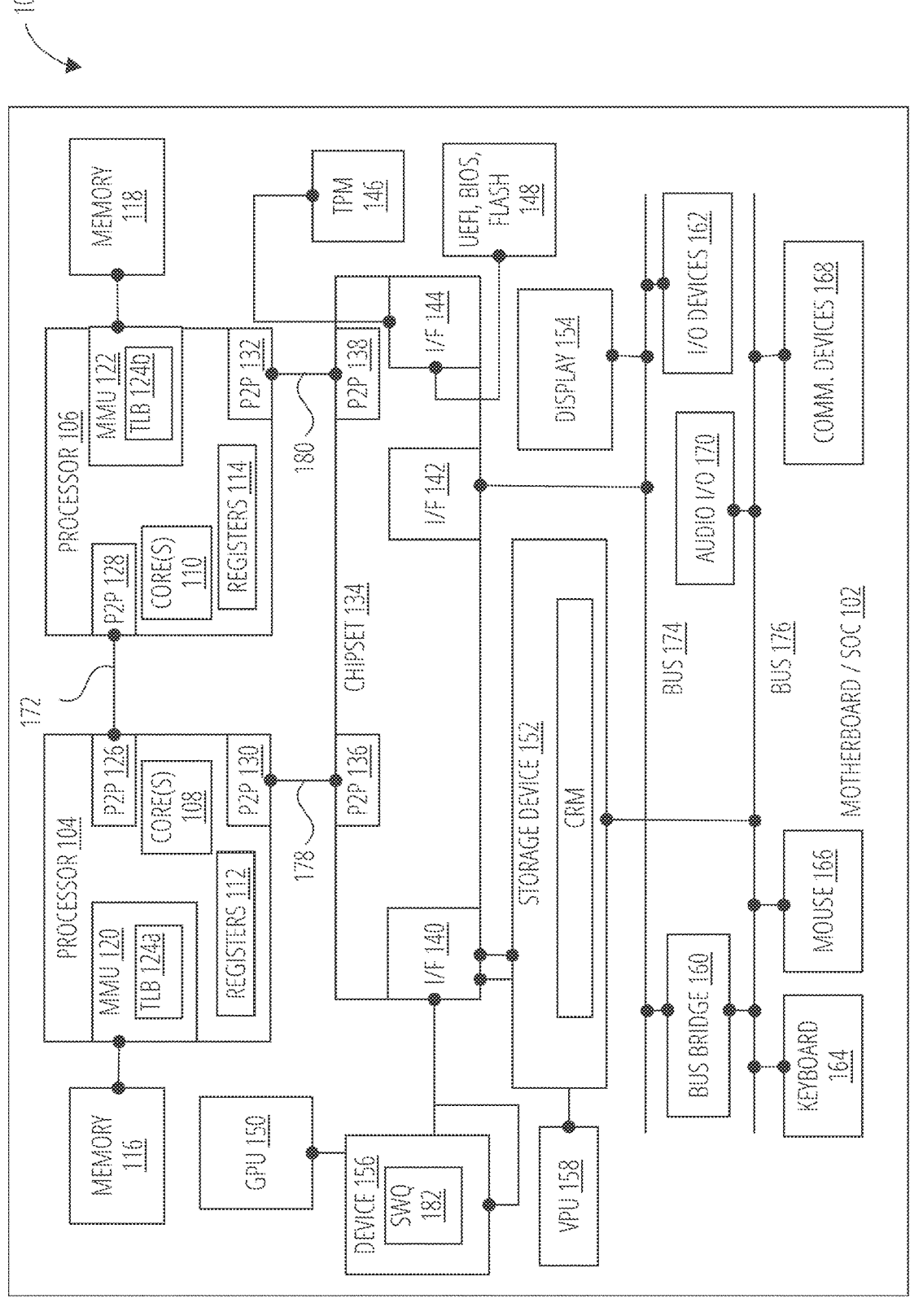
FIG. 1 illustrates an aspect of the subject matter in accordance with one embodiment.

Embodiments disclosed herein provide techniques to limit the rate at which software is able to submit work to the shared work queues of computing devices. More specifically, embodiments disclosed herein extend translation lookaside buffer (TLB) entries to include metrics describing the access to shared work queues by different processes. The accesses may be based on instructions that submit a work descriptor via a non-posted write (e.g., a Deferrable Memory Write (DMWr)). One example of such an instruction is an ENQCMD. Based on these metrics and applicable policies (e.g., thresholds, time intervals, etc.), embodiments disclosed herein may abort the execution of an instruction without triggering additional mechanisms to handle cases where the instruction is not accepted by the shared work queue (e.g., due to capacity or other temporal reasons).

For example, embodiments disclosed herein may maintain, in the TLB, a count reflecting the number of instructions submitted by a process to the shared work queue during a time interval. When a process executing on a processor submits an instruction, embodiments disclosed herein intercept the command for address translation via a memory management unit (MMU). The counter in the TLB may be incremented to reflect the submitted instruction. If the counter exceeds a threshold, embodiments disclosed herein abort execution of the instruction and trigger an MMU fault which returns a retry status to the process. If the counter does not exceed the threshold, the execution continues (e.g., the instruction is submitted to the shared work queue and a success response is returned to the process).

Advantageously, embodiments disclosed herein help limit the rate at which processes can submit work to shared work queues of devices. For example, a shared work queue compliant with the Peripheral Component Interconnect-enhanced (PCIe) specification must accept a DMWr within a time limit. When multiple processes issue instructions to the shared work queue, these transactions compete against each other. If processes issue requests maliciously and/or at a sufficiently high rate, other processes may be denied access to the shared work queue (e.g., due to a capacity of the shared work queue, a flow control credit limitation, or a time limitation). A service level agreement (SLA) implemented in the device may guarantee fairness and priority of device resource utilization. However, the SLA cannot resolve the competition and/or denial of service (DOS) issues by itself. Furthermore, the SLA cannot increase the number of DMWrs that are accepted within a time limit. Advantageously, however, embodiments disclosed herein can rebalance the rate at which processes generate non-posted writes targeting the shared work queues. Doing so mitigates the competition between processes, reduces the risk of DOS attacks, and facilitates the acceptance of these writes within the required time limit. Doing so improves the functioning and security of all associated computing devices. Furthermore, by providing configurable thresholds and other policy parameters, different processes may be able to submit non-posted writes at different rates.

With general reference to notations and nomenclature used herein, one or more portions of the detailed description which follows may be presented in terms of program procedures executed on a computer or network of computers. These procedural descriptions and representations are used by those skilled in the art to convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-a (or 123a) may include components 123-1, 123-2, 123-3, 123-4, and 123-5. The embodiments are not limited in this context.

FIG. 1 illustrates an embodiment of a system 100 that rate limits commands for shared work queues in accordance with various embodiments. System 100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 100 may have a single processor with one core or more than one processor. Note that the term "processor" refers to a processor with a single core or a processor package with multiple processor cores. More generally, the computing system 100 is configured to implement all logic, systems, logic flows, methods, apparatuses, and functionality described herein with reference to FIGS. 1-9.

As used in this application, the terms "system" and "component" and "module" are intended to refer to a computer-related entity, either hardware, a combination of hardware and software, software, or software in execution, examples of which are provided by the exemplary system 100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 1, system 100 comprises a motherboard or system-on-chip (SoC) 102 for mounting platform components. Motherboard or system-on-chip (SoC) 102 is a point-to-point (P2P) interconnect platform that includes a first processor 104 and a second processor 106 coupled via a point-to-point interconnect 172 such as an Ultra Path Interconnect (UPI). In other embodiments, the system 100 may be of another bus architecture, such as a multi-drop bus. Furthermore, each of processor 104 and processor 106 may be processor packages with multiple processor cores including core(s) 108 and core(s) 110, respectively. While the system 100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 104 and chipset 134. Some platforms may include additional components and some platforms may only include sockets to mount the processors and/or the chipset. Furthermore, some platforms may not have sockets (e.g. SoC, or the like). Although depicted as a motherboard or SoC 102, one or more of the components of the motherboard or SoC 102 may also be included in a single die package, a multi-chip module (MCM), a multi-die package, a chiplet, a bridge, and/or an interposer. Therefore, embodiments are not limited to a motherboard or a SoC.

The processor 104 and processor 106 can be any of various commercially available processors, including without limitation an Intel® Celeron®, Core®, Core (2) Duo®, Itanium®, Pentium®, Xeon®, and XScale® processors; AMD Athlon®, Duron® and Opteron®; processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 104 and/or processor 106. Additionally, the processor 104 need not be identical to processor 106.

Processor 104 includes a memory management unit (MMU) 120 and point-to-point (P2P) interface 126 and P2P interface 130. Similarly, the processor 106 includes a memory management unit (MMU) 122 as well as P2P interface 128 and P2P interface 132. MMU 120 and MMU 122 couple the processor 104 and processor 106, respectively, to respective memories (e.g., memory 116 and memory 118). Memory 116 and memory 118 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 116 and the memory 118 locally attach to the respective processors (i.e., processor 104 and processor 106). In other embodiments, the main memory may couple with the processors via a bus and shared memory hub. Processor 104 includes registers 112 and processor 106 includes registers 114. Although depicted as being components of the processors 104, 106, in some embodiments, the MMU 120 and MMU 122 may be external to the processors 104, 106. The MMUs 120, 122 may generally translate a virtual memory address into a physical memory address using paging techniques. A memory controller may translate the physical memory address to an address in memory (e.g., memory 116, memory 118).

As shown, the MMU 120 includes a data translation lookaside buffer (TLB) 124a and MMU 122 includes a TLB 124b. Generally, a data TLB stores the most recent translations from virtual memory addresses to physical memory addresses. Therefore, the TLB 124a stores the most recent translations for processor 104 while TLB 124b stores the most recent translations for processor 106. Furthermore, the MMU 120 and MMU 122 may include a respective page table structure (not pictured) to break physical memory (e.g., memory 116, memory 118) into a plurality of virtual pages and store all translations from virtual memory addresses to physical memory addresses.

System 100 includes chipset 134 coupled to processor 104 and processor 106. Furthermore, chipset 134 can be coupled to storage device 152, for example, via an interface (I/F) 140. The I/F 140 may be, for example, a Peripheral Component Interconnect-enhanced (PCIe) interface, a Compute Express Link® (CXL) interface, or a Universal Chiplet Interconnect Express (UCIe) interface. Storage device 152 can store instructions executable by circuitry of system 100 (e.g., processor 104, processor 106, GPU 150, device 156, vision processing unit 158, or the like). For example, storage device 152 can store instructions for the work queue engine 206 of FIG. 2, or the like.

Processor 104 couples to the chipset 134 via P2P interface 130 and P2P 136 while processor 106 couples to the chipset 134 via P2P interface 132 and P2P 138. Direct media interface (DMI) 178 and DMI 180 may couple the P2P interface 130 and the P2P 136 and the P2P interface 132 and P2P 138, respectively. DMI 178 and DMI 180 may be a high-speed interconnect that facilitates, e.g., eight Giga Transfers per second (GT/s) such as DMI 3.0. In other embodiments, the processor 104 and processor 106 may interconnect via a bus.

The chipset 134 may comprise a controller hub such as a platform controller hub (PCH). The chipset 134 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 134 may comprise more than one controller hub such as a chipset with a memory controller hub, a graphics controller hub, and an input/output (I/O) controller hub.

In the depicted example, chipset 134 couples with a trusted platform module (TPM) 146 and UEFI, BIOS, FLASH circuitry 148 via I/F 144. The TPM 146 is a dedicated microcontroller designed to secure hardware by integrating cryptographic keys into devices. The UEFI, BIOS, FLASH circuitry 148 may provide pre-boot code.

Furthermore, chipset 134 includes the I/F 140 to couple chipset 134 with a high-performance graphics engine, such as, graphics processing circuitry or a graphics processing unit (GPU) 150. In other embodiments, the system 100 may include a flexible display interface (FDI) (not shown) between the processor 104 and/or the processor 106 and the chipset 134. The FDI interconnects a graphics processor core in one or more of processor 104 and/or processor 106 with the chipset 134.

Additionally, device 156 and/or vision processing unit 158 (VPU) can be coupled to chipset 134 via I/F 140. The device 156 is representative of any type of peripheral device, such as an accelerator device (e.g., cryptographic accelerator, cryptographic co-processor, an offload engine, etc.) a storage device (e.g., the storage device 152), a GPU (e.g., the GPU 150), a VPU (e.g., the VPU 158), a network interface device, or any other device. For example, the device 156 may be a USB device, PCI device, PCIe device, CXL device, UCIe device, and/or an SPI device. The device 156 may include one or more shared work queues 182. Generally, a shared work queue 182 is configured to store descriptors submitted by multiple software entities (e.g., a process, a thread, an application, a virtual machine, a container, a microservice, etc.) that share the device 156. The shared work queue shared work queues 182 may be include one or more registers (not pictured).

For example, the device 156 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the shared work queue 182 via a non-posted write (e.g., a deferred memory write (DMWr)). One example of an instruction that atomically submits a work descriptor to the shared work queue 182 is the ENQCMD command or instruction (which may be referred to as "ENQCMD" herein) supported by the Intel®; Instruction Set Architecture (ISA). However, any instruction having a descriptor that includes indications of the operation to be performed, a source virtual address for the descriptor, a destination virtual address for a device-specific register of the shared work queue 182, virtual addresses of parameters, a virtual address of a completion record, and an identifier of an address space of the submitting process is representative of an instruction that atomically submits a work descriptor to the shared work queue 182.

Various I/O devices 162 and display 154 couple to the bus 174, along with a bus bridge 160 which couples the bus 174 to a second bus 176 and an I/F 142 that connects the bus 174 with the chipset 134. In one embodiment, the second bus 176 may be a low pin count (LPC) bus. Various devices may couple to the second bus 176 including, for example, a keyboard 164, a mouse 166 and communication devices 168.

Furthermore, an audio I/O 170 may couple to second bus 176. Many of the I/O devices 162 and communication devices 168 may reside on the motherboard or system-on-chip (SoC) 102 while the keyboard 164 and the mouse 166 may be add-on peripherals. In other embodiments, some or all the I/O devices 162 and communication devices 168 are add-on peripherals and do not reside on the motherboard or system-on-chip (SoC) 102.

Figure 2:
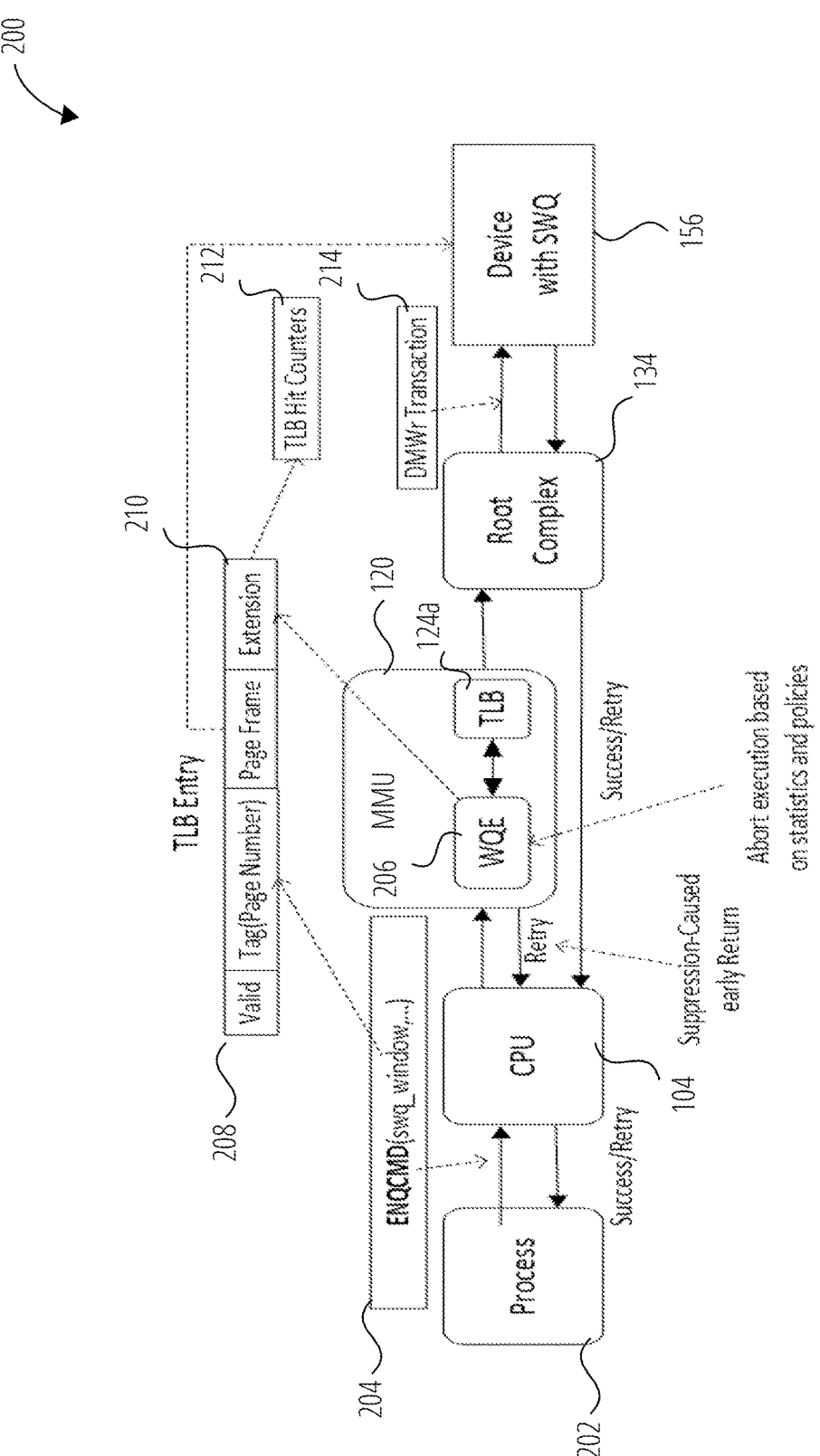
FIG. 2 illustrates an aspect of the subject matter in accordance with one embodiment.

FIG. 2 is a schematic 200 illustrating techniques for rate limiting of instructions that target shared work queues in accordance with various embodiments. As shown, a process 202 may execute on a processor, such as the processor 104. The process 202 is representative of any type of executable code, such as a thread, an application, a virtual machine, a container, a microservice, etc. As shown, the process 202 generates an ENQCMD 204. As stated, an ENQCMD may include a virtual address of an MMIO shared work queue 182 (e.g., a register) of the device 156. As shown, therefore, the "swq_window" parameter of ENQCMD 204 may be a virtual address to the shared work queue 182 of the device 156. The process 202 may generally issue the ENQCMD 204 from user space and the processor 104 may generate the virtual address for the register of the shared work queue 182.

The MMU 120 of processor 104 may then receive the ENQCMD 204. As shown, the MMU 120 includes a work queue engine 206 ("WQE" 206), which may be implemented in hardware, software, or a combination of hardware and software. The work queue engine 206 is generally configured to limit the rate at which a given process 202 can submit ENQCMDs 204 to the shared work queue 182. The work queue engine 206 may leverage the TLBs 124a, which is extended to include metadata describing accesses to the shared work queues 182. For example, TLB entry 208 includes a TLB extension 210 portion that includes one or more TLB hit counters 212. The TLB extension 210 may further include a bit to indicate whether a translation in the TLB 124a is associated with a register of a shared work queue 182 of the device 156. The hit counters 212 may include one or more counters to count the number of ENQCMDs 204 issued by a given process 202 within a time interval, a threshold exceeded counter for the process (e.g., whether the ENQCMD counter for the process is exceeded), and a back-off counter indicating a duration of the suppression. In some embodiments, the hit counters 212 further include a time-to-trigger counter indicating when to apply suppression of ENQCMDs 204 for a process. The work queue engine 206 may store threshold values for each of a plurality of different processes (also referred to as an "ENQCMD threshold"). The ENQCMD threshold values may generally indicate a limit to the number of ENQCMDs a process can submit during a time interval. The ENQCMD threshold values may be based on a SLA. For example, a first process associated with a first client may have a first threshold value, while a second process associated with a second client may have a second threshold value, different than the first threshold value.

Figure 3:
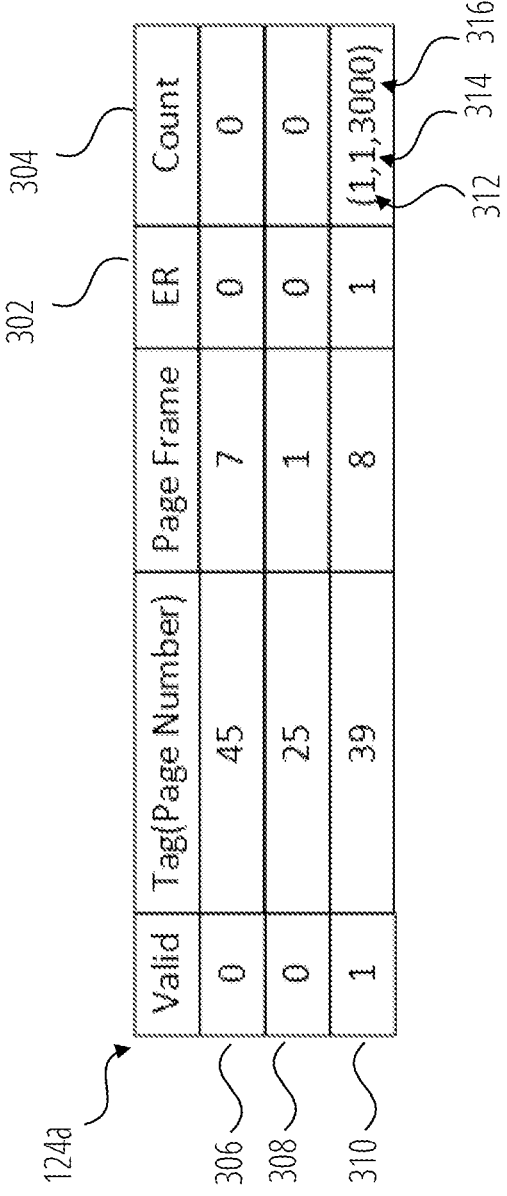
FIG. 3 illustrates an aspect of the subject matter in accordance with one embodiment.

FIG. 3 illustrates three example TLB entries, namely TLB entry 306, TLB entry 308, and TLB entry 310. The TLB entries may be in the TLB 124a and/or the TLB 124b. For the sake of clarity, the entries are discussed with reference to TLB 124a. As shown, the TLB 124a includes an enqueue register (ER) bit 302 and count bits 304. The enqueue register bit 302 indicates whether a given entry in the TLB 124a is associated with a register of a shared work queue 182 of the device 156. Because MMIO addresses are allocated at system boot, the addresses associated with the device 156 and/or the shared work queue 182 are known. Where applicable (e.g., in TLB entry 310), the count bits 304 include three different values, namely a back-off counter 312 (e.g., a duration of ENQCMD suppression), a threshold exceeded counter 314 (e.g., whether the ENQCMD threshold for a process has been exceeded), and a TLB hit counter 316 reflecting TLB hits for the virtual address (e.g., the virtual address of the shared work queue 182). Therefore, TLB entry 310, with a "1" in the enqueue register bit 302, indicates that the TLB entry 310 is associated with an enqueue register (e.g., the shared work queue 182). Furthermore, TLB entry 310, with values of (1, 1, 3000) in count bits 304 indicates that the back-off counter 312 has a value of 1 (e.g., that some time remains on the back-off counter), that the ENQCMD threshold for the process has been exceeded (based on threshold exceeded counter 314), and 3000 TLB hits have occurred (based on TLB hit counter 316) for the process based on the virtual address of the associated enqueue register (e.g., of the shared work queue 182). However, TLB entry 306 and TLB entry 308, having enqueue register bits 302 set to zero, are not associated with a shared work queue 182.

In some embodiments, the count bits 304 may be pointers to another location that stores the values for the back-off counter 312, threshold exceeded counter 314, and the TLB hit counter 316. For example, the pointer may be to one or more performance monitor counter registers (e.g., the registers 512 of FIG. 5). In some embodiments, the count bits 304 may be in one more unused reserved (or ignored) bits of a given page table entry (and correspondingly each TLB entry).

Returning to FIG. 2, the work queue engine 206 may access the TLB 124a using the virtual address specified in the ENQCMD 204. If there is a miss in the TLB 124a for the virtual address (e.g., there is no translation for the virtual address in the TLB 124a), the work queue engine 206 may determine that rate limiting for the process 202 is not needed. Stated differently, because there is no entry in the TLB 124a for the virtual address, the process 202 has not recently issued ENQCMDs targeting the virtual address, and rate limiting is not needed. Instead, the TLB 124a may be updated with an entry from the page table corresponding to the virtual address and execution of the ENQCMD 204 may continue.

If there is a hit in the TLB 124a for the virtual address (e.g., a translation for the virtual address exists in an entry of the TLB 124a, such as the TLB entry 310), the work queue engine 206 may determine whether the enqueue register bit 302 is set to 1. For example, there may be a hit in the TLB 124a for the virtual address specified by ENQCMD 204 in TLB entry 310. Because the enqueue register bit 302 is set to 1, the work queue engine 206 determines the ENQCMD 204 is associated with the shared work queue 182. If the back-off counter is equal to 0), the process 202 is not being rate limited, and the work queue engine 206 may increment the back-off counter by 1. The execution of the ENQCMD 204 may continue via with the physical address from the TLB entry 310 and the DMWr transaction 214 may be issued to the physical address of the shared work queue 182. A success message may then be returned to the process 202

If, however, the back-off counter is set to 1, the work queue engine 206 rejects the TLB hit and aborts execution of the ENQCMD 204. For example, the work queue engine 206 may trigger a fault and return a status of "retry" to the process 202. Because the back-off counter in TLB entry 310 is set to 1, the process 202 may have exceeded its ENQCMD threshold (e.g., the value of 3000 for the TLB hit counter may exceed the ENQCMD threshold for the process 202). Therefore, the work queue engine 206 may abort execution of the ENQCMD 204, trigger a fault, and return a status of retry to the process 202.

Furthermore, the work queue engine 206 may periodically (e.g., at the end and/or beginning of a time interval) analyze the entries in the TLB 124a. The work queue engine 206 may identify any entries in the TLB 124a that have the enqueue register bit 302 set (e.g., to 1). If the back-off counter 312 of the entry equals zero, the TLB hit counter 316 is determined for the current time interval. The TLB hit counter 316 may then be reset to zero. If the back-off counter 312 does not equal zero, a timer is restarted, the back-off counter 312 is decremented by 1, and the TLB hit counter 316 is reset to zero.

Furthermore, if the TLB hit counter 316 is greater than or equal to the ENQCMD threshold for the process, the work queue engine 206 begins rate limiting of ENQCMDs submitted by the process. For example the work queue engine 206 may increment the threshold exceeded counter 314 by 1 in the TLB entry. If the TLB hit counter 316 is less than the ENQCMD threshold for the process, the threshold exceeded counter 314 is reset to 0 and the timer is restarted.

In some embodiments, the work queue engine 206 may divide a time-to-trigger value for the process by the sampling interval. If the threshold exceeded counter 314 is greater than or equal to the value returned by dividing a time-to-trigger value for the process by the sampling interval, the threshold exceeded counter 314 is reset to zero and the back-off counter 312 is set by dividing a back-off time for the process and the sampling interval.

Advantageously, because the virtual address of the shared work queue 182 in the TLB entry 310 is associated with the virtual address space of the process 202, the TLB 124a may be used to track the number accesses to the shared work queue 182 by the process 202. Any hits for the virtual address can be associated with the process 202, and used to limit the rate at which the process 202 can submit ENQCMDs when the TLB hit counter 316 exceeds the ENQCMD threshold for the process. Furthermore, different processes have different virtual address spaces, and each virtual address space therefore has a distinct virtual address for the register of the shared work queue 182. Therefore, TLB hits can be associated with the respective process based on the virtual address of a given ENQCMD instruction, and the work queue engine 206 may rate limit each process accordingly. Furthermore, by tuning the parameters (e.g., ENQCMD threshold, time-to-trigger, back-off counter 312, etc.), different performance and latency requirements can be applied for different clients.

Figure 4:
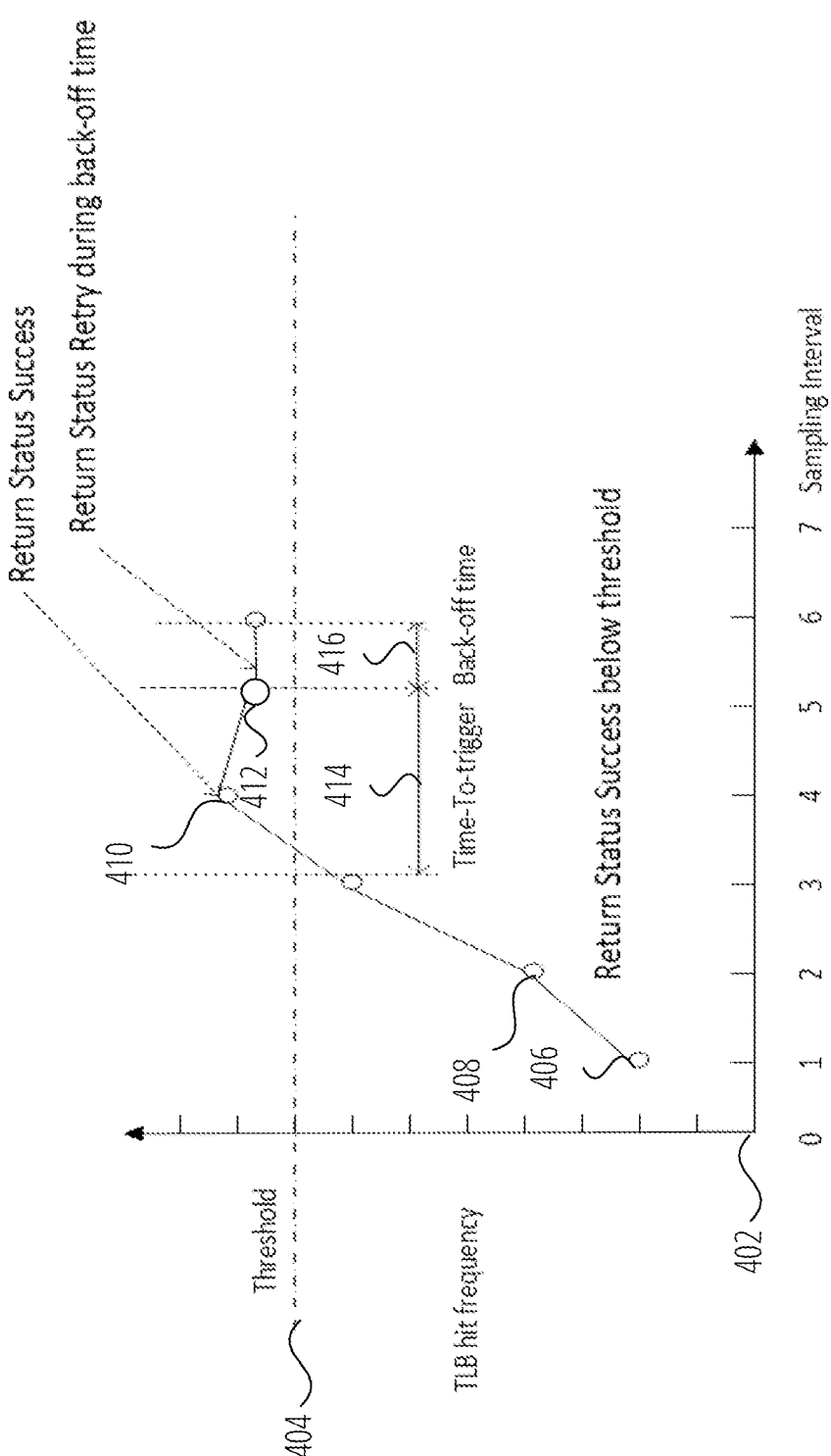
FIG. 4 illustrates an aspect of the subject matter in accordance with one embodiment.

FIG. 4 illustrates a graph 402 that depicts techniques to limit the rate at which processes issue commands to shared work queues in accordance with various embodiments. As shown, the y-axis of the graph 402 corresponds to the TLB hit frequency for a given process, which may correspond to the TLB hit counter 316. The x-axis of the graph 402 may correspond to a time interval, where each time interval is a predetermined period of time. Generally, As shown, an ENQCMD threshold 404 may indicate the ENQCMD threshold for the process.

As stated, the work queue engine 206 may implement rate limiting when the TLB hit counter 316 of a process exceeds the threshold 404. Therefore, at points 406 and point 408, the ENQCMDs issued by the process are executed and a success message is returned to the process because the TLB hit counter 316 does not exceed the ENQCMD threshold 404. In contrast, at point 410, the TLB hit counter 316 of the process exceeds the ENQCMD threshold 404. However, the work queue engine 206 permits execution of the ENQCMD at point 410 and returns a status success message because the point 410 is within the time-to-trigger interval 414. The time-to-trigger interval 414 generally indicates a period of time that the work queue engine 206 is willing to tolerate a process having a TLB hit counter 316 that exceeds the ENQCMD threshold. In some embodiments, the time-to-trigger interval 414 is based on a predetermined number of time intervals (e.g., one time interval, two time intervals, etc.) where the TLB hit counter 316, exceeds the ENQCMD threshold 404. Once the time-to-trigger interval 414 elapses, the work queue engine 206 may begin suppressing ENQCMDs.

Therefore, at point 412 which is after the time-to-trigger interval 414 elapses, the work queue engine 206 begins suppression of ENQCMDs submitted by the process. As shown, the work queue engine 206 may abort execution of the ENQCMD issued at point 412 and return a status retry message to the issuing process. Furthermore, any additional ENQCMDs issued by the process during the back-off time interval 416 are similarly rejected by the work queue engine 206. The back-off time interval 416 may be any predetermined number of time intervals (e.g., one time interval, two time intervals, etc.). Because the work queue engine 206 restricts the execution of ENQCMDs during the back-off time interval 416, the TLB hit counter 316 of the process should subsequently fall below the ENQCMD threshold 404, at which point the process may be able to execute ENQCMDs.

Figure 5:
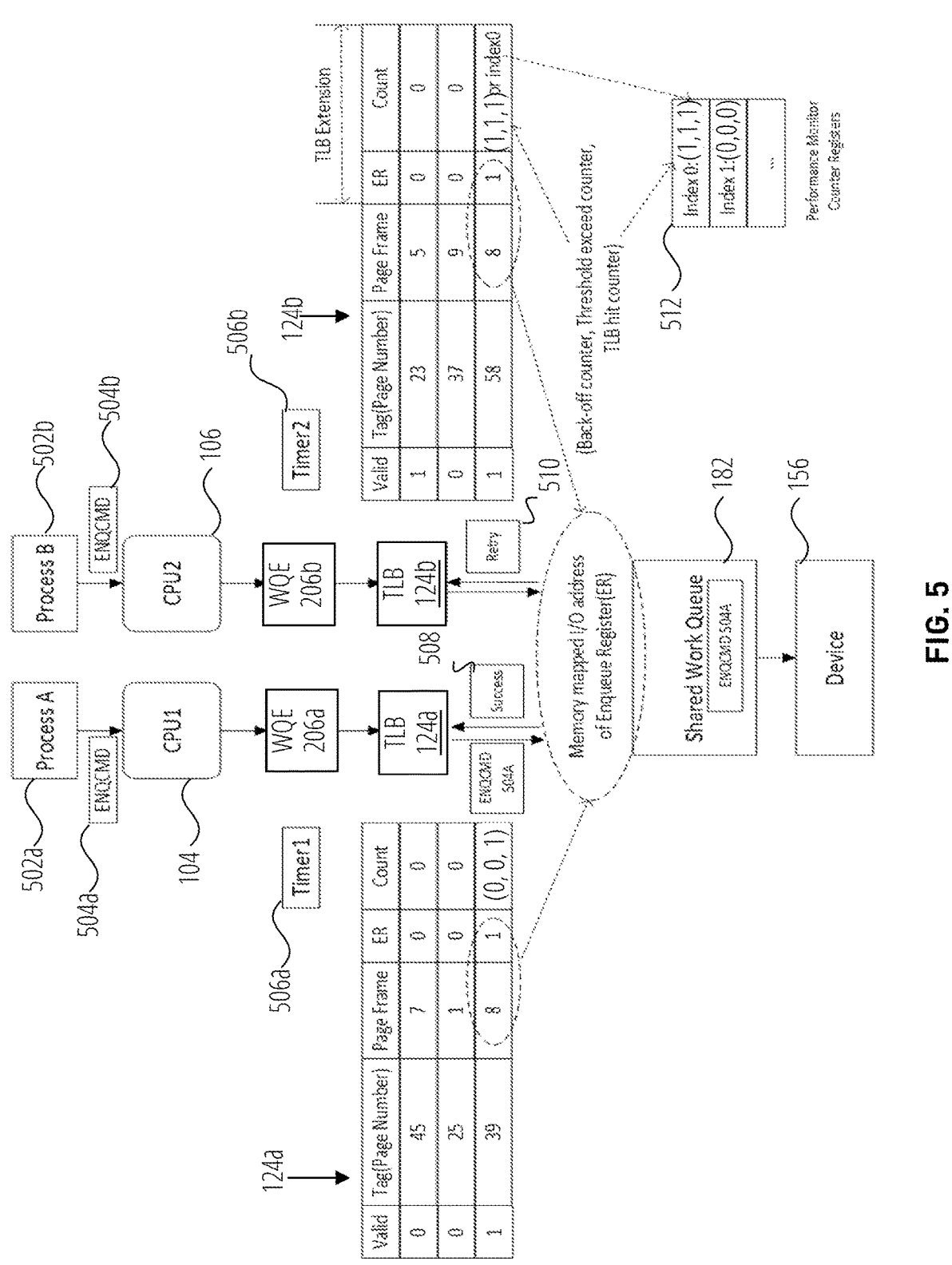
FIG. 5 illustrates an aspect of the subject matter in accordance with one embodiment.

FIG. 5 illustrates an example of competition between processes for a shared work queue in accordance with various embodiments. As shown, timer 506a may be associated with processor 104 and timer 506b may be associated with processor 106. The timers 506a, 506b may be implemented in hardware, software, or a combination thereof. The timers 506a, 506b may be configured to define the time intervals for the work queue engine 206. The timers 506a, 506b may be restarted at each new time interval.

As shown, a process 502a may execute on processor 104 and a process 502b may execute on processor 106. The process 502a and process 502a may be single-threaded and/or multi-threaded processes, and may be associated with any executable code (e.g., a process, a thread, an application, a virtual machine, a container, a microservice, etc.). As shown, process 502a issues an ENQCMD 504a while process 502b issues an ENQCMD 504b. The MMU 120 and TLB 124a of processor 104 may access ENQCMD 504a, while MMU 122 and TLB 124b of processor 106 may access ENQCMD 504b.

The work queue engine 206a of MMU 120 may index the TLB 124a based on the virtual address of the ENQCMD 504a. If there is a hit in the TLB 124a, the work queue engine 206a of MMU 120 may determine whether the enqueue register bit 302 is set. In the example depicted in FIG. 5, there is a TLB 124a hit and the corresponding enqueue register bit 302 is set. The work queue engine 206a may then determine the back-off counter 312, threshold exceeded counter 314, and TLB hit counter 316 for the corresponding TLB entry in the TLB 124a. For example, the threshold exceeded counter 314 of TLB 124a may indicate that the TLB hit counter 316 of the process does not exceed the ENQCMD threshold for the process 502a. Based on the back-off counter 312, threshold exceeded counter 314, and TLB hit counter 316, the work queue engine 206a may determine to permit execution of the ENQCMD 504a and return a success message 508 to the process 502a. The ENQCMD 504a may then be sent to the shared work queue 182 using a non-posted write, and the associated workload may be executed by the device 156.

The work queue engine 206b of MMU 122 may index the TLB 124b based on the virtual address of the ENQCMD 504b. If there is a hit in the TLB 124b, the work queue engine 206b of MMU 122 may determine whether the enqueue register bit 302 is set. In the example depicted in FIG. 5, there is a TLB 124b hit and the corresponding enqueue register bit 302 is set. The work queue engine 206b may then determine the back-off counter 312, threshold exceeded counter 314, and TLB hit counter 316 for the corresponding TLB entry in the TLB 124*b*. Based on the back-off counter 312, threshold exceeded counter 314, and TLB hit counter 316 in TLB 124*b*, the work queue engine 206*b* may determine to abort execution of the ENQCMD 504*a* and return a retry message 510 to the process 502*b*. For example, the process 502*b* may then wait a predetermined amount of time and resubmit the ENQCMD 504*b*.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 6:
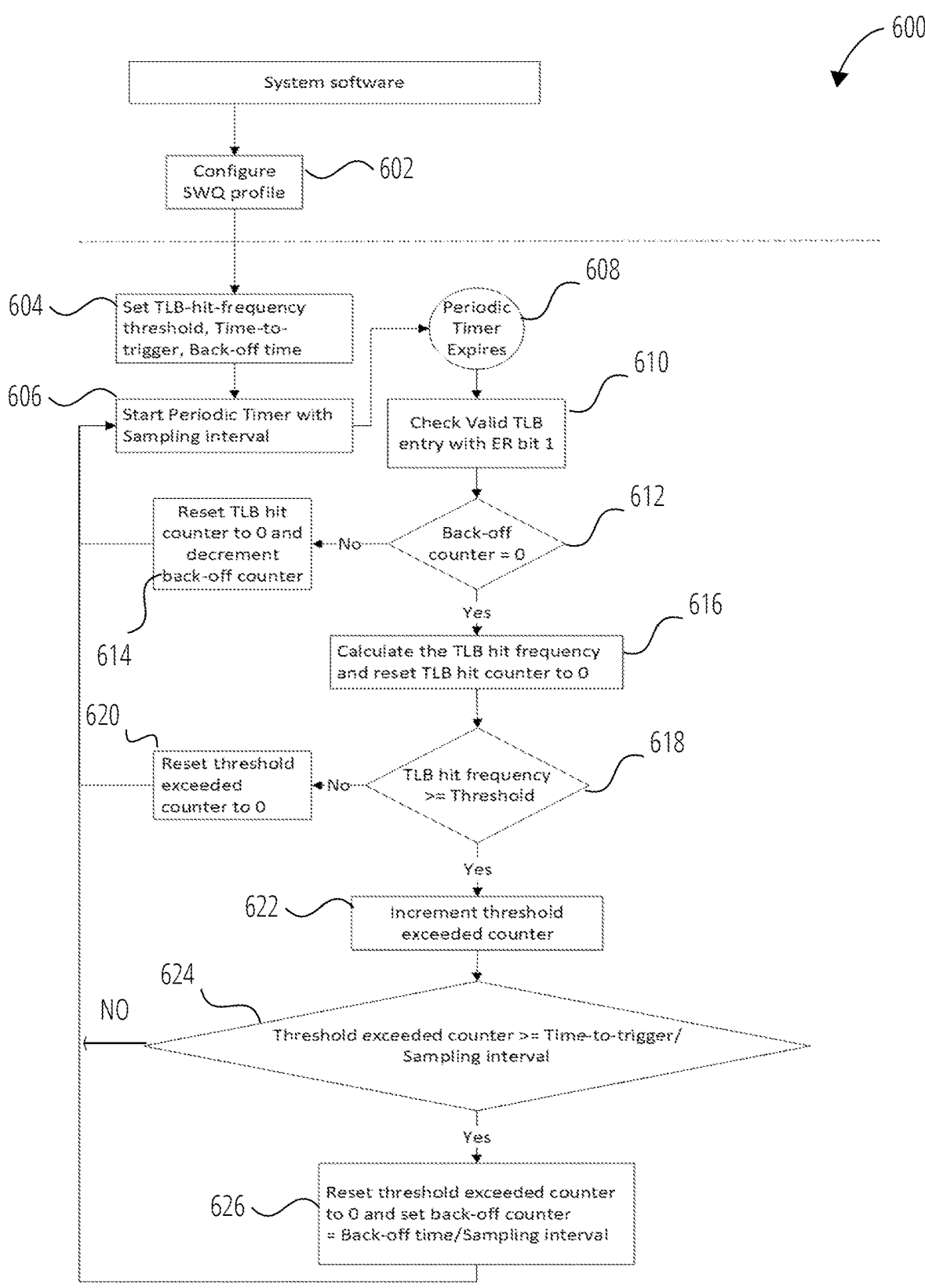
FIG. 6 illustrates a logic flow in accordance with one embodiment.

FIG. 6 illustrates an embodiment of a logic flow 600. The logic flow 600 may be representative of some or all of the operations executed by one or more embodiments described herein. For example, the logic flow 600 may include some or all of the operations performed by a background process for periodic rate limiting of instructions that target shared work queues. The embodiments are not limited in this context.

Figure 7:
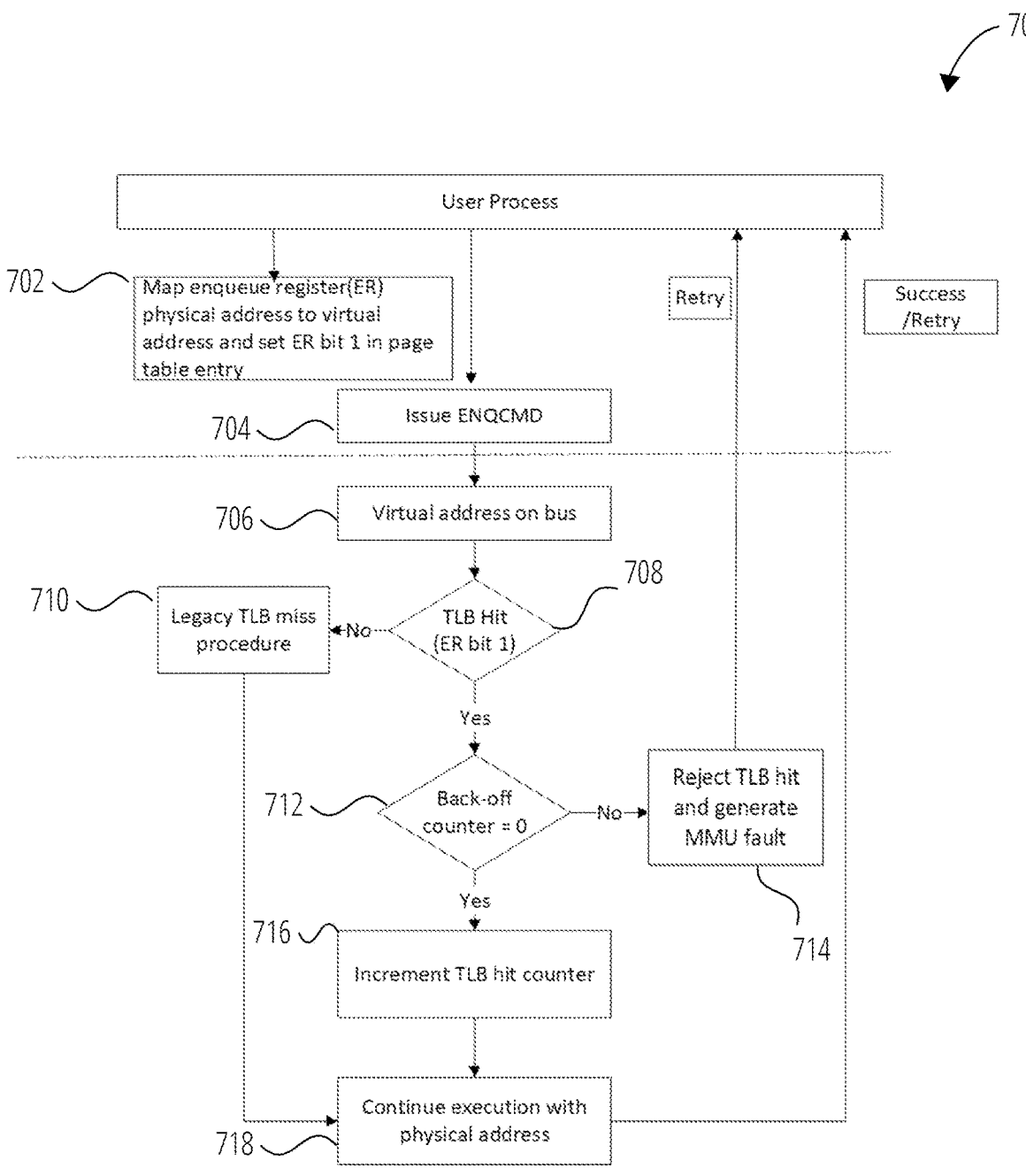
FIG. 7 illustrates a logic flow in accordance with one embodiment.

Generally, the logic flow 600 may be periodically executed as a background process to rate limit ENQCMD instructions submitted by a process (e.g., via the logic flow 700 depicted in FIG. 7). As shown, at block 602 of logic flow 600, system software (e.g., an operating system, hypervisor, etc.) may configure a software profile for the shared work queue 182 for each of a plurality of tenants (or processes). The software profile may include, for example, an ENQCMD threshold 404 (a threshold number of ENQCMDs a process can submit during a time interval), the time-to-trigger interval 414, back-off time interval 416, and sampling interval for each process. Furthermore, the physical address of a register for each shared work queue 182 is mapped to a virtual address space for each process in the software profile. At block 604, the software profile (including address mappings) for each process may be stored in the work queue engine 206 and/or MMUs 120, 122.

At block 606, a timer (e.g., one or more of the timers 506*a*, 506*b*) are started based on the sampling interval defined at blocks 602-604. At block 608, the timer expires at the end of a sampling interval (e.g., 1 microsecond, etc.). At block 610, the work queue engine 206 identifies entries in the TLB (e.g., the TLB 124*a*, TLB 124*b*) for any entries including an enqueue register bit 302 that is set (e.g., entries corresponding to a register of a shared work queue 182). The logic flow 600 may proceed to block 612 for each entry identified at block 610. At block 612, the work queue engine 206 determines whether the back-off counter 312 of the TLB entry is not set (e.g., equals zero). If the back off counter is not equal to zero, the logic flow 600 proceeds to block 614. At block 614, the work queue engine 206 resets the TLB hit counter 316 for the entry, decrements the back-off counter 312 by 1, and the logic flow 600 returns to block 606.

Returning to block 612, if the back-off counter 312 equals zero, the logic flow 600 proceeds to block 616. At block 616, the work queue engine 206 determines the TLB hit counter 316 for the TLB entry. At block 618, the work queue engine

206 determines whether the TLB hit counter 316 is greater than or equal to the ENQCMD threshold 404 for the process. If the TLB hit counter 316 is not greater than or equal to the ENQCMD threshold 404, the logic flow 600 proceeds to block 620, where the work queue engine 206 resets the threshold exceeded counter 314 to zero and the logic flow 600 returns to block 606. If the TLB hit counter 316 is greater than or equal to the threshold 404, the logic flow 600 proceeds to block 622, where the work queue engine 206 increments the threshold exceeded counter 314 for the TLB entry.

At block 624, the work queue engine 206 determines whether the threshold exceeded counter 314 is greater than or equal to a quotient of the time-to-trigger interval 414 for the process and the sampling interval for the process. If the threshold exceeded counter 314 is less than the quotient of the time-to-trigger interval 414 for the process and the sampling interval for the process, the logic flow 600 returns to block 606. If the threshold exceeded counter 314 is greater than or equal to the quotient of the time-to-trigger interval 414 for the process and the sampling interval for the process, the logic flow 600 proceeds to block 626, where the work queue engine 206 begins rate limiting for the process. More specifically, the work queue engine 206 may reset the threshold exceeded counter 314 for the process to zero and set the back-off counter 312 for the process to the back-off time interval 416 of the process divided by the sampling interval for the process.

FIG. 7 illustrates an embodiment of a logic flow 700. The logic flow 700 may be representative of some or all of the operations executed by one or more embodiments described herein. For example, the logic flow 700 may include some or all of the operations performed for periodic rate limiting of instructions that target shared work queues. The embodiments are not limited in this context.

As shown, at block 702, a user space process (e.g., process 202, process 502*a*, process 502*b*, etc.) maps the physical address of a register associated with a shared work queue 182 to a virtual address in the virtual address space for the process. The mapping may be stored in an entry of the page table of the MMU 120 or MMU 122 and the enqueue register bit 302 for the entry may be set to 1. At block 704, the process issues an ENQCMD that specifies a virtual address of a register of a shared work queue 182. At block 706, the processor 104 or 106 on which the process is executing generates the virtual address for the register of the shared work queue specified by the ENQCMD and the virtual address is provided to the work queue engine 206 and/or the MMU 120, 122. At block 708, the work queue engine 206 determines whether there is a hit in the TLB (e.g., TLB 124*a*, TLB 124*b*) for the processor and whether the enqueue register bit 302 for the entry is set.

If there is no TLB hit (or the enqueue register bit 302 is not set to 1), the instruction does not target the shared work queue 182 and a legacy TLB miss procedure is completed at block 710. In such embodiments, the TLB may be filled with the entry determined from the page table using the legacy TLB miss procedure (e.g., the TLB 124*a*, 124*b* is filled with the page table entry returned from the legacy TLB miss procedure). The logic flow 700 may then proceed to block 718.

Returning to block 708, if there is a TLB hit and the enqueue register bit 302 for the entry is set to 1, the logic flow 700 proceeds to block 712, where the work queue engine 206 determines whether the back-off counter 312 for the TLB entry identified at block 708 equals zero. If the back-off counter 312 does not equal zero, the work queue engine 206 may abort execution of the ENQCMD at block 714, e.g., because the process is being restricted from submitting ENQCMDs. The work queue engine 206 may therefore reject the TLB hit and generate a fault (e.g., a MMU fault or other translation fault) and a retry status message is returned to the process at block 714.

Returning to block 712, if the back-off counter 312 equals zero, the ENQCMD of the process is not being rate limited and the logic flow 700 proceeds to block 716. At block 716, the work queue engine 206 increments the TLB hit counter 316 for the entry by a predetermined value (e.g., 1). At block 718, the execution of the ENQCMD continues based on the physical address of the register of the shared work queue 182. For example, a non-posted memory write may be made to the physical address of the register of the shared work queue 182 to provide the ENQCMD to the shared work queue 182. A success message may be returned to the process and the device 156 may execute one or more operations associated with the ENQCMD.

FIG. 8 illustrates an embodiment of a logic flow 800. The logic flow 800 may be representative of some or all of the operations executed by one or more embodiments described herein. For example, the logic flow 800 may include some or all of the operations performed for periodic rate limiting of instructions that target shared work queues. The embodiments are not limited in this context.

In block 802, a memory management unit (e.g., MMU 120, 122) of a processor (e.g., processor 104, 106) receives a command associated with a process, the command to specify an operation to be performed by another device. In block 804, the memory management unit determines a counter value associated with a shared work queue of the another device, an indication the shared work queue to be specified by the command. In block 806, the memory management unit determines whether to accept or reject the command based on the counter value and a threshold for the process.

FIG. 9 illustrates an embodiment of a storage medium 900. Storage medium 900 may comprise any non-transitory computer-readable storage medium or machine-readable storage medium, such as an optical, magnetic, or semiconductor storage medium. In various embodiments, storage medium 900 may comprise an article of manufacture. In some embodiments, storage medium 900 may store computer-executable instructions, such as computer-executable instructions to implement one or more of logic flows or operations described herein, such as instructions 904, 906, and 908 for logic flows 600, 700, 800 of FIGS. 6-8, respectively. The storage medium 900 may further store computer-executable instructions 902 for the work queue engine 206. The processor 104 or processor 106 may execute any of the instructions in storage medium 900. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

Example 1 includes a processor, comprising: a processor core; and a memory management unit to comprise circuitry configured to: receive a command associated with a process, the command to specify an operation to be performed by another device; determine a counter value associated with a shared work queue of the another device, an indication the shared work queue to be specified by the command; and determine whether to accept or reject the command based on the counter value and a threshold for the process.

Example 2 includes the subject matter of example 1, the circuitry configured to: determine a back-off counter for the process, wherein the circuitry further determines whether to accept or reject the command based on the back-off counter for the process.

Example 3 includes the subject matter of example 2, the circuitry configured to: determine a threshold exceeded counter for the process, wherein the circuitry further determines whether to accept or reject the command based on the threshold exceeded counter for the process.

Example 4 includes the subject matter of example 3, wherein the back-off counter, the threshold exceeded counter, and the counter value are to be stored in an entry in a translation lookaside buffer (TLB) of the memory management unit.

Example 5 includes the subject matter of example 4, wherein the entry of the TLB is further to store an enqueue register bit to indicate the command is associated with a shared work queue of the another device.

Example 6 includes the subject matter of example 1, wherein the command is to atomically submit a work descriptor to the another device.

Example 7 includes the subject matter of example 1, wherein the another device comprises a Peripheral Component Interconnect Express (PCIe) device, a Compute Express Link (CXL) device, or a Universal Chiplet Interconnect Express (UCIe) device.

Example 8 includes the subject matter of example 1, wherein the process is associated with one or more of: (i) an application, (ii) a container, (iii) a virtual machine, or (iv) a microservice.

Example 9 includes the subject matter of example 1, the circuitry configured to: reject the command based on a determination that the counter exceeds the threshold; and return, to the process, a retry message.

Example 10 includes the subject matter of example 1, the circuitry configured to: accept the command based on a determination that the counter does not exceed the threshold; submit, based on a non-posted write, the command to a register of a shared work queue of the another device; and return, to the process, a success message.

Example 11 includes the subject matter of example 1, wherein the threshold and the counter value are to be stored in an entry in a translation lookaside buffer (TLB) of the memory management unit.

Example 12 includes the subject matter of example 11, wherein the command is to specify a virtual address of a register of a shared work queue of the another device, wherein the entry in the TLB is to comprise a mapping of the virtual address to a physical address, wherein the entry in the TLB is to comprise an enqueue register bit to indicate the command is associated with the shared work queue.

Example 13 includes a method, comprising: receiving, by a memory management unit of a processor, a command associated with a process, the command to specify an operation to be performed by another device; determining, by the memory management unit, a counter value associated with a shared work queue of the another device, an indication the shared work queue to be specified by the command; and determining, by the memory management unit, whether to accept or reject the command based on the counter value and a threshold for the process.

Example 14 includes the subject matter of example 13, further comprising: determining, by the memory management unit, a back-off counter for the process, wherein the memory management unit further determines whether to accept or reject the command based on the back-off counter for the process.

Example 15 includes the subject matter of example 14, further comprising: determining, by the memory management unit, a threshold exceeded counter for the process, wherein the memory management unit further determines whether to accept or reject the command based on the threshold exceeded counter for the process.

Example 16 includes the subject matter of example 15, wherein the back-off counter, the threshold exceeded counter, and the counter value are to be stored in an entry in a translation lookaside buffer (TLB) of the memory management unit.

Example 17 includes the subject matter of example 16, wherein the entry of the TLB is further to store an enqueue register bit to indicate the command is associated with a shared work queue of the another device.

Example 18 includes the subject matter of example 13, wherein the command is to atomically submit a work descriptor to the another device.

Example 19 includes the subject matter of example 13, wherein the another device comprises a Peripheral Component Interconnect Express (PCIe) device, a Compute Express Link (CXL) device, or a Universal Chiplet Interconnect Express (UCIe) device.

Example 20 includes the subject matter of example 13, wherein the process is associated with one or more of: (i) an application, (ii) a container, (iii) a virtual machine, or (iv) a microservice.

Example 21 includes the subject matter of example 13, further comprising: rejecting, by the memory management unit, the command based on a determination that the counter exceeds the threshold; and returning, by the memory management unit to the process, a retry message.

Example 22 includes the subject matter of example 13, further comprising: accepting, by the memory management unit, the command based on a determination that the counter does not exceed the threshold; submitting, by the memory management unit based on a non-posted write, the command to a register of a shared work queue of the another device; and returning, by the memory management unit to the process, a success message.

Example 23 includes the subject matter of example 13, wherein the threshold and the counter value are to be stored in an entry in a translation lookaside buffer (TLB) of the memory management unit.

Example 24 includes the subject matter of example 23, wherein the command is to specify a virtual address of a register of a shared work queue of the another device, wherein the entry in the TLB is to comprise a mapping of the virtual address to a physical address, wherein the entry in the TLB is to comprise an enqueue register bit to indicate the command is associated with the shared work queue.

Example 25 includes a non-transitory computer-readable storage medium, the computer-readable storage medium including instructions that when executed by a processor, cause the processor to: receive, by a memory management unit of the processor, a command associated with a process, the command to specify an operation to be performed by another device; determine, by the memory management unit, a counter value associated with a shared work queue of the another device, an indication the shared work queue to be specified by the command; and determine, by the memory management unit, whether to accept or reject the command based on the counter value and a threshold for the process.

Example 26 includes the subject matter of example 25, wherein the instructions further cause the processor to: determine, by the memory management unit, a back-off counter for the process, wherein the memory management unit further determines whether to accept or reject the command based on the back-off counter for the process.

Example 27 includes the subject matter of example 26, wherein the instructions further cause the processor to:

determine, by the memory management unit, a threshold exceeded counter for the process, wherein the memory management unit further determines whether to accept or reject the command based on the threshold exceeded counter for the process.

Example 28 includes the subject matter of example 27, wherein the back-off counter, the threshold exceeded counter, and the counter value are to be stored in an entry in a translation lookaside buffer (TLB) of the memory management unit.

Example 29 includes the subject matter of example 28, wherein the entry of the TLB is further to store an enqueue register bit to indicate the command is associated with a shared work queue of the another device.

Example 30 includes the subject matter of example 25, wherein the command is to atomically submit a work descriptor to the another device.

Example 31 includes the subject matter of example 25, wherein the another device comprises a Peripheral Component Interconnect Express (PCIe) device, a Compute Express Link (CXL) device, or a Universal Chiplet Interconnect Express (UCIe) device.

Example 32 includes the subject matter of example 25, wherein the process is associated with one or more of: (i) an application, (ii) a container, (iii) a virtual machine, or (iv) a microservice.

Example 33 includes the subject matter of example 25, wherein the instructions further cause the processor to: reject, by the memory management unit, the command based on a determination that the counter exceeds the threshold; and return, by the memory management unit to the process, a retry message.

Example 34 includes the subject matter of example 25, wherein the instructions further cause the processor to: accept, by the memory management unit, the command based on a determination that the counter does not exceed the threshold; submit, by the memory management unit based on a non-posted write, the command to a register of a shared work queue of the another device; and return, by the memory management unit to the process, a success message.

Example 35 includes the subject matter of example 25, wherein the threshold and the counter value are to be stored in an entry in a translation lookaside buffer (TLB) of the memory management unit.

Example 36 includes the subject matter of example 35, wherein the command is to specify a virtual address of a register of a shared work queue of the another device, wherein the entry in the TLB is to comprise a mapping of the virtual address to a physical address, wherein the entry in the TLB is to comprise an enqueue register bit to indicate the command is associated with the shared work queue.

Example 37 includes an apparatus, comprising: means for receiving a command associated with a process, the command to specify an operation to be performed by another device; means for determining a counter value associated with a shared work queue of the another device, an indication the shared work queue to be specified by the command; and means for determining whether to accept or reject the command based on the counter value and a threshold for the process.

Example 38 includes the subject matter of example 37, further comprising: means for determining a back-off counter for the process, wherein the memory management unit further determines whether to accept or reject the command based on the back-off counter for the process.

Example 39 includes the subject matter of example 38, further comprising: means for determining a threshold exceeded counter for the process, wherein the memory management unit further determines whether to accept or reject the command based on the threshold exceeded counter for the process.

Example 40 includes the subject matter of example 39, wherein the back-off counter, the threshold exceeded counter, and the counter value are to be stored in an entry in a translation lookaside buffer (TLB) of a memory management unit.

Example 41 includes the subject matter of example 40, wherein the entry of the TLB is further to store an enqueue register bit to indicate the command is associated with a shared work queue of the another device.

Example 42 includes the subject matter of example 37, wherein the command is to atomically submit a work descriptor to the another device.

Example 43 includes the subject matter of example 37, wherein the another device comprises a Peripheral Component Interconnect Express (PCIe) device, a Compute Express Link (CXL) device, or a Universal Chiplet Interconnect Express (UCIe) device.

Example 44 includes the subject matter of example 37, wherein the process is associated with one or more of: (i) an application, (ii) a container, (iii) a virtual machine, or (iv) a microservice.

Example 45 includes the subject matter of example 37, further comprising: means for rejecting the command based on a determination that the counter exceeds the threshold; and means for returning, to the process, a retry message.

Example 46 includes the subject matter of example 37, further comprising: means for accepting the command based on a determination that the counter does not exceed the threshold; means for submitting, based on a non-posted write, the command to a register of a shared work queue of the another device; and means for returning, to the process, a success message.

Example 47 includes the subject matter of example 37, wherein the threshold and the counter value are to be stored in an entry in a translation lookaside buffer (TLB) of the memory management unit.

Example 48 includes the subject matter of example 47, wherein the command is to specify a virtual address of a register of a shared work queue of the another device, wherein the entry in the TLB is to comprise a mapping of the virtual address to a physical address, wherein the entry in the TLB is to comprise an enqueue register bit to indicate the command is associated with the shared work queue.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A processor, comprising:
a processor core; and
a memory management unit to comprise circuitry configured to:
receive a command associated with a process, the command to specify an operation to be performed by another device;
determine a counter value associated with a shared work queue of the another device, an indication of the shared work queue to be specified by the command; and
determine whether to accept or reject the command based on the counter value and a threshold for the process.

2. The processor of claim 1, the circuitry configured to: determine a back-off counter for the process, wherein the circuitry further determines whether to accept or reject the command based on the back-off counter for the process.

3. The processor of claim 2, the circuitry configured to: determine a threshold exceeded counter for the process, wherein the circuitry further determines whether to accept or reject the command based on the threshold exceeded counter for the process.

4. The processor of claim 3, wherein the back-off counter, the threshold exceeded counter, and the counter value are to be stored in an entry in a translation lookaside buffer (TLB) of the memory management unit.

5. The processor of claim 4, wherein the entry of the TLB is further to store an enqueue register bit to indicate the command is associated with the shared work queue of the another device.

6. The processor of claim 1, wherein the command is to atomically submit a work descriptor to the another device.

7. The processor of claim 1, wherein the another device comprises a Peripheral Component Interconnect Express (PCIe) device, a Compute Express Link (CXL) device, or a Universal Chiplet Interconnect Express (UCIe) device.

8. The processor of claim 1, wherein the process is associated with one or more of: (i) an application, (ii) a container, (iii) a virtual machine, or (iv) a microservice.

9. The processor of claim 1, the circuitry configured to: reject the command based on a determination that the counter exceeds the threshold; and
return, to the process, a retry message.

10. The processor of claim 1, the circuitry configured to: accept the command based on a determination that the counter does not exceed the threshold;
submit, based on a non-posted write, the command to a register of the shared work queue of the another device; and
return, to the process, a success message.

11. The processor of claim 1, wherein the threshold and the counter value are to be stored in an entry in a translation lookaside buffer (TLB) of the memory management unit.

12. The processor of claim 11, wherein the command is to specify a virtual address of a register of the shared work queue of the another device, wherein the entry in the TLB is to comprise a mapping of the virtual address to a physical address, wherein the entry in the TLB is to comprise an enqueue register bit to indicate the command is associated with the shared work queue.

13. A method, comprising:
receiving, by a memory management unit of a processor, a command associated with a process, the command to specify an operation to be performed by another device;
determining, by the memory management unit, a counter value associated with a shared work queue of the another device, an indication of the shared work queue to be specified by the command; and
determining, by the memory management unit, whether to accept or reject the command based on the counter value and a threshold for the process.

14. The method of claim 13, further comprising:
determining, by the memory management unit, a back-off counter for the process, wherein the memory management unit further determines whether to accept or reject the command based on the back-off counter for the process.

15. The method of claim 14, further comprising:
determining, by the memory management unit, a threshold exceeded counter for the process, wherein the memory management unit further determines whether to accept or reject the command based on the threshold exceeded counter for the process.

16. The method of claim 15, wherein the back-off counter, the threshold exceeded counter, and the counter value are to be stored in an entry in a translation lookaside buffer (TLB) of the memory management unit.

17. The method of claim 16, wherein the entry of the TLB is further to store an enqueue register bit to indicate the command is associated with the shared work queue of the another device.

18. The method of claim 13, wherein the command is to atomically submit a work descriptor to the another device.

19. The method of claim 13, wherein the another device comprises a Peripheral Component Interconnect Express (PCIe) device, a Compute Express Link (CXL) device, or a Universal Chiplet Interconnect Express (UCIe) device.

20. The method of claim 13, wherein the process is associated with one or more of: (i) an application, (ii) a container, (iii) a virtual machine, or (iv) a microservice.

21. The method of claim 13, further comprising:
rejecting, by the memory management unit, the command based on a determination that the counter exceeds the threshold; and
returning, by the memory management unit to the process, a retry message.

22. The method of claim 13, further comprising:
accepting, by the memory management unit, the command based on a determination that the counter does not exceed the threshold;
submitting, by the memory management unit based on a non-posted write, the command to a register of the shared work queue of the another device; and
returning, by the memory management unit to the process, a success message.

23. The method of claim 13, wherein the threshold and the counter value are to be stored in an entry in a translation lookaside buffer (TLB) of the memory management unit.

24. The method of claim 23, wherein the command is to specify a virtual address of a register of the shared work queue of the another device, wherein the entry in the TLB is to comprise a mapping of the virtual address to a physical address, wherein the entry in the TLB is to comprise an enqueue register bit to indicate the command is associated with the shared work queue.

25. A non-transitory computer-readable storage medium, the computer-readable storage medium including instructions that when executed by a processor, cause the processor to:

receive, by a memory management unit of the processor, a command associated with a process, the command to specify an operation to be performed by another device;

determine, by the memory management unit, a counter value associated with a shared work queue of the another device, an indication of the shared work queue to be specified by the command; and determine, by the memory management unit, whether to accept or reject the command based on the counter value and a threshold for the process.

\* \* \* \* \*